US00RE35581E

United States Patent [19]

Nakamura et al.

[11] E Patent Number: Re. 35,581

[45] Reissued Date of Patent: Aug. 12, 1997

[54] CHARGING DEVICE

[75] Inventors: Shunji Nakamura; Hiromitsu Hirabayashi; Junji Araya; Noribumi Koitabashi, all of Yokohama, Japan

[73] Assignee: Canon Kabushiki Kaisha, Tokyo, Japan

[21] Appl. No.: 562,788

[22] Filed: Nov. 27, 1995

Related U.S. Patent Documents

Reissue of:

[64] Patent No.: 4,851,960
Issued: Jul. 25, 1989
Appl. No.: 131,585
Filed: Dec. 11, 1987

U.S. Applications:

[63] Continuation of Ser. No. 38,195, Mar. 22, 1993, abandoned, which is a continuation of Ser. No. 735,797, Jul. 25, 1991, abandoned.

[30] Foreign Application Priority Data

Dec. 15, 1986 [JP] Japan ..... 61-298419
Dec. 15, 1986 [JP] Japan ..... 61-298420

[51] Int. Cl.[6] ..... G03G 15/02

[52] U.S. Cl. ..... 361/225; 250/325; 399/170

[58] Field of Search ..... 355/213, 219–224; 361/212, 214, 220, 221, 225, 229, 230, 235; 250/324–326; 430/102

[56] References Cited

U.S. PATENT DOCUMENTS

| | | | |
|---|---|---|---|
| 2,777,957 | 1/1957 | Walkup | 250/325 |
| 3,076,092 | 1/1963 | Mott | 250/326 |
| 3,800,154 | 3/1974 | Tanaka | 250/326 |
| 3,936,174 | 2/1976 | Carpenter | 355/274 |
| 4,292,387 | 9/1981 | Kanbe et al. | 430/102 |
| 4,371,252 | 2/1983 | Uehida et al. | 361/225 |
| 4,380,384 | 4/1983 | Ueno et al. | 355/219 |
| 4,455,078 | 6/1984 | Mukai et al. | 361/221 X |
| 4,469,435 | 9/1984 | Nosaki et al. | 355/303 |

FOREIGN PATENT DOCUMENTS

| | | |
|---|---|---|
| 35745 | 9/1981 | European Pat. Off. . |
| 280542 | 8/1988 | European Pat. Off. . |
| 47-30329 | 11/1972 | Japan . |
| 49-5034 | 1/1974 | Japan . |
| 49-83444 | 8/1974 | Japan . |
| 49-37864 | 10/1974 | Japan . |
| 55-18659 | 2/1980 | Japan . |
| 55-21080 | 2/1980 | Japan . |
| 55-35319 | 3/1980 | Japan . |
| 56-104347 | 8/1981 | Japan . |
| 56-146156 | 11/1981 | Japan . |
| 57-185455 | 11/1982 | Japan . |
| 58-40566 | 3/1983 | Japan . |
| 58-72981 | 5/1983 | Japan . |
| 58-147747 | 9/1983 | Japan . |
| 58-194061 | 11/1983 | Japan . |
| 60-134261 | 7/1985 | Japan . |
| 60-182451 | 9/1985 | Japan . |
| 60-216361 | 10/1985 | Japan . |
| 2129372 | 5/1984 | United Kingdom . |

OTHER PUBLICATIONS

"Design and Material Properties of Photosensitive Device", Koji Kitamura, 31st Seminar of Electrophotography: Basics and Trends of Imaging Technology Under Progress, pp. 18–20 (Jul. 18–19, 1991).

(List continued on next page.)

*Primary Examiner*—D. Rutledge
*Attorney, Agent, or Firm*—Fitzpatrick, Cella, Harper & Scinto

[57] ABSTRACT

A charging device for contact-charging a member to be charged. A charging device for charging a movable member to be charged includes a contacting member adapted to contacting the member to be charged, and means for forming a vibratory electric field between the member to be charged and the contacting member, the vibratory electric field forming means applying between the members a vibratory voltage having a peak-to-peak value not less than twice an absolute value of a charge starting voltage to the member to be charged. The member to be charged can be uniformly charged.

22 Claims, 7 Drawing Sheets

OTHER PUBLICATIONS

"AC Corona", Static Electricity Handbook, Static Electricity Institute, p. 218 (May 30, 1981).

"Breakdown Voltage of Electrostatic Recording", Masatoshi Kimura, et al., Electronic Communications Paper Journal, pp. 805–812 (Nov. 1983).

"Conductive Fur Brush Charging of a Dielectric Surface", Masahiro Wanou, et al., Conference Proceedings of the 1986 IEEE Industry Applications Society Annual Meeting, pp. 1272–1276 (Sep. 28–Oct. 3, 1986).

39th Research Meeting of the Japanese Electrophotography Association, pp. 1–5 (Jun. 10, 1977).

"Electrophotography," R.M. Schaffert, pp. 317–335 (1965).

"Charging Mechanism of Conductive Brush Charging," F. Kenkyusho et al., Journal of Japanese Electrophotography Association, pp. 35–39 (Nov. 86).

"Corona Charging Characteristics of Electrophotographic Photosensitive Layers (II)." Takashi Kitamura, et al., Journal of Japanese Electrophotography Association, pp. 26–36 (Apr. 30, 1975).

The Latest Amorphous Si Handbook, Hirotaka Motoyama (publisher), pp. 366–373 (Mar. 31, 1983).

37th Research Meeting of Japanese Electrophotography Association, pp. 15–19 (Jun. 7, 1976).

"Corona Charging Characteristics of Electrophotographic Photosensitive Layers (III)," Takashi Kitamura et al., Journal of Japanese Electrophotography Association, pp. 17–28 (Nov. 30, 1976).

"Electrophotographic Photosensitive Material," Takashi Kitamura, Journal of Japanese Static Electricity Association, vol. 9, No. 4, pp. 229–237 (Sep. 4, 1985).

Japanese Patent Abstract 56–104347, vol. 6, No. 175, (P–88) [847], Nov. 11, 1981.

CHARGING DEVICE

Matter enclosed in heavy brackets [ ] appears in the original patent but forms no part of this reissue specification; matter printed in italics indicates the additions made by reissue.

*This application is a continuation of application Ser. No. 08/038,195, filed Mar. 22, 1993, which is a continuation of application Ser. No. 07/735,797, filed Jul. 25, 1991, both now abandoned.*

FIELD OF THE INVENTION AND RELATED ART

The present invention relates to a charging device for charging a member to be charged, and more particularly to a contact charging device which charges a member to be charged by contacting a member supplied with a voltage to the member to be charged. The charging device of the present invention is suitably usable as a charging means for an image forming apparatus of an electrophotographic apparatus or an electrostatic recording apparatus.

This description will be made with respect to, as an example, charging a photosensitive member for an electrophotographic apparatus.

As is well-known, the electrophotographic process which includes the step of uniformly charging the surface of the photosensitive member. Almost all of the electrophotographic machines commercialized at present [includes] *include* a corona discharger mainly consisting of a wire electrode and a shield electrode. However, the charging system using the corona discharger involves the following problems:

(1) High voltage application:

In order to provide 500–700 V of the surface potential, a voltage as high as 4–8 KV is required to be applied to the wire electrode. The discharger is bulky in order to maintain a large distance between the wire electrode and shield electrode to prevent the leakage of the current to the shield electrode and the body, and also the use of a highly insulative shielded cable [of] becomes inevitable.

(2) Low charging efficiency:

Most of the discharging current from the wire electrode flows to the shield electrode, and only several percent of the total discharging current flows to the photosensitive member which is a member to be charged.

(3) Corona discharge product:

By corona discharge, ozone or the like is produced, so that an image is easily blurred due to oxidation of the parts and ozone deterioration of the photosensitive member surface (this is particularly the case under high humidity conditions). In consideration of the effect of the ozone on the human body, [a] *an* ozone absorbing and/or decomposition filter and a fan, or the like, to move air to a filter are necessitated.

(4) Wire contamination:

In order to enhance discharge efficiency, a discharge wire having a large curvature (generally 60–100 microns in diameter) is used. The wire surface attracts fine dust in the apparatus by the strong electric field and is contaminated thereby. The wire contamination leads to non-uniform discharge, resulting in a non-uniform image. Therefore, the wire or the inside of the discharger has to be cleaned.

Recently, a determination has been made not to use the corona discharger involving the above described problems but rather to use a contact charging means as the charging means.

More particularly, a conductive member such as a conductive wire brush or a conductive elastic roller externally supplied with a DC voltage of approximately 1 KV or a superposed DC and AC voltage is contacted to the photosensitive member surface which is the member to be charged, so that the photosensitive surface is charged to a predetermined potential (for example, see U.S. Pat. No. 4,455,078 or Japanese Laid-Open Patent Application No. 104347/1981).

However, even if the photosensitive member surface to be charged is charged by the contact charging method, the photosensitive member cannot be uniformly charged, and a spotty charge occurs. The reason for this is considered to be that there is incomplete contact between the conductive member supplied with the voltage and the photosensitive member surface contacted thereto, taken microscopically, due to the non-smoothness of those contact surfaces. This is the case even if the image forming process including the image exposure is executed on the [photosensitive member surface] spotty non-uniform photosensitive member surface, the output contains the spotty image corresponding to the non-uniform charge, and a high quality image cannot be obtained.

SUMMARY OF THE INVENTION

Accordingly, it is a principal object of the present invention to provide an improved contact charging method to charge a member using a contact charging member.

It is another object of the invention to provide a charging device for stably and uniformly charging a member.

It is a further object of the invention to provide a charging device which is supplied with a relatively low voltage as compared with a conventional corona discharger and which can efficiently charge the member.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
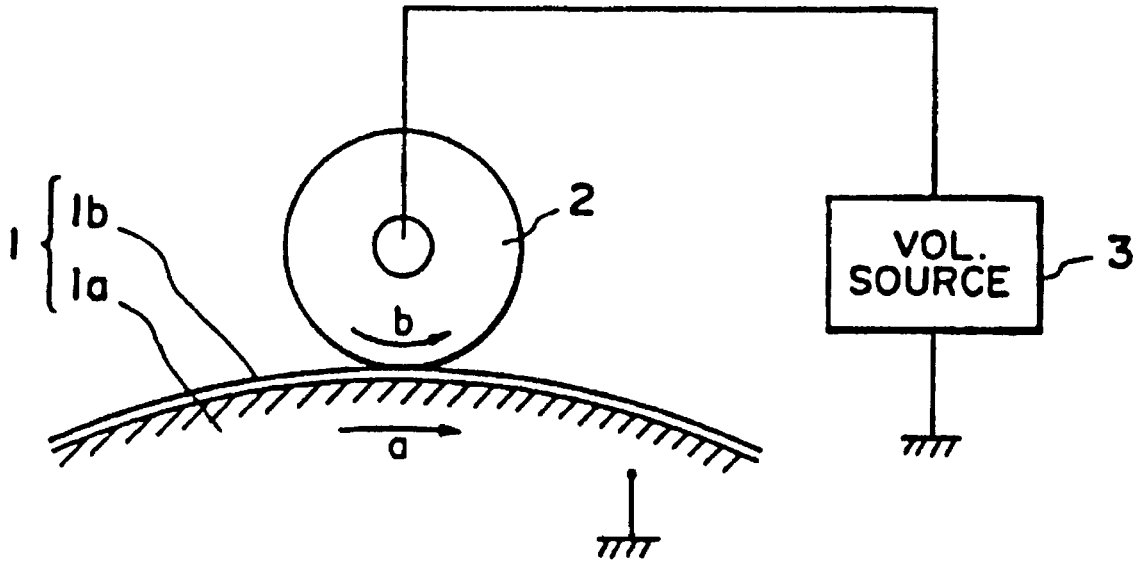
FIG. 1 is a sectional view of a part of a photosensitive drum as a member to be charged and a conductive roller, as a contacting member, contacted to the surface of the photosensitive member.

Referring to FIG. 1, reference numeral 1 designates a part of an electrophotographic photosensitive drum as an example of a member to be charged. The drum 1 comprises an electrically conductive drum base 1a and a photosensitive layer 1b (photoconductive semiconductor layer of an organic photoconductive, amorphous silicon, selenium or the like) and is rotated at a predetermined speed in the direction indicated by an arrow a. A conductive roller 2 is contacted to the surface of the photosensitive drum 1 under a predetermined pressure, and it rotates in the direction indicated by an arrow b following the rotation of the photosensitive drum 1. The conductive roller 2 is supplied with a voltage from the voltage source 3.

Figure 2A:
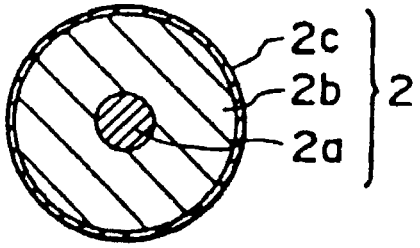
FIGS. 2A and 2B are sectional views of examples of the conductive rollers.

FIG. 2A shows an example of a structure of a conductive roller 2, wherein a metal core rod 2a is coated with a two layer structure comprising an elastic rubber layer 2b made of EPDM or NPR, for example and a urethane rubber layer 2c, thereon, (resistance is approx. $10^5$ ohm) containing carbon dispersed therein.

Figure 2B:
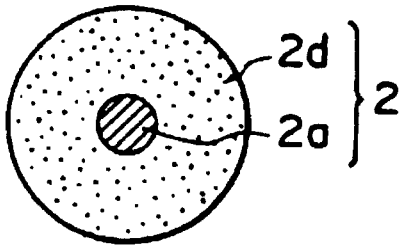

FIG. 2B shows another example wherein a metal core rod 2a coated with a single layer structure comprising urethane foam layer 2d containing carbon dispersed therein.

In any case, the conductive roller usable with this embodiment includes a metal core coated with a material having resistivity of $10^2$–$10^{10}$ ohm-cm.

The [contact member] *conductive roller* 2 may be a non-rotatable member, pad or belt member.

Figure 7:
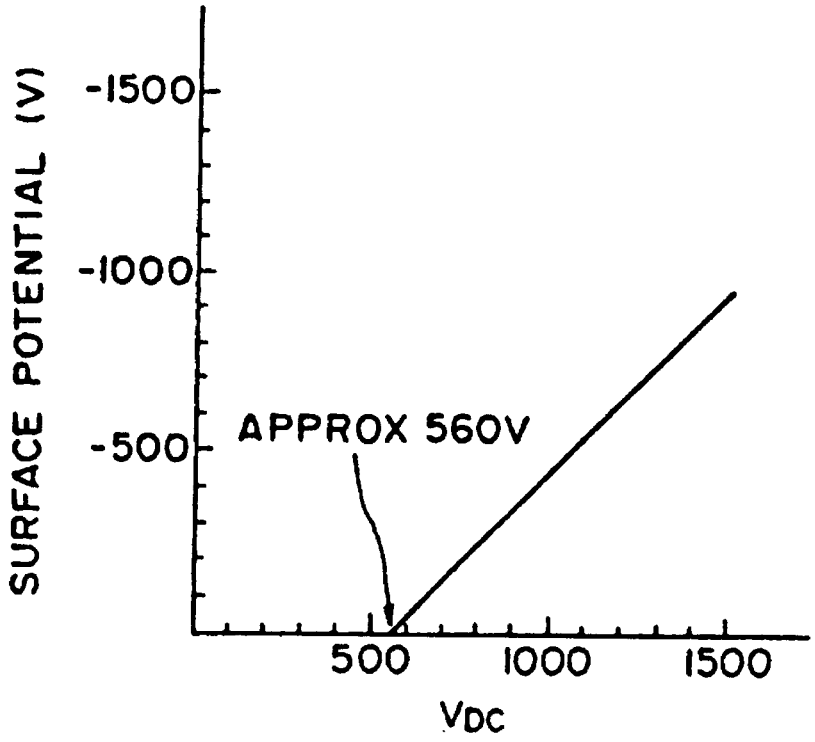
FIGS. 7 and 10 are graphs showing the relationships between an applied DC voltage $V_{DC}$ and the charge potential V of the photosensitive drum.

Now, a description will be made as to the charging of the photosensitive drum 1 using the conductive roller:

I. When a DC voltage is applied to the conductive roller:

In this example, the photosensitive layer 1b of the photosensitive drum 1 includes a CGL (carrier generating layer) of azo pigment and CTL (carrier transfer layer) having a thickness of 19 microns and containing a mixture of [α] *hydrazine* and resin. The photosensitive layer is an OPC (organic photoconductor) layer of a negative property. The OPC drum is rotationally driven, the surface of which is contacted by the conductive roller 2. The conductive roller 2 is supplied with a DC voltage $V_{DC}$ to effect the contact charging to the OPC photosensitive drum in the dark. The surface potential V of the OPC photosensitive drum 1 charged by the conductive roller 2 and the DC voltage $V_{DC}$ applied to the conductive roller 2 are measured. FIG. 7 shows the results of the measurements. The charging action involves a threshold concerning the DC voltage $V_{DC}$ applied. The charging effect starts at approximately 560 V. The surface potential V provided by the applied voltage, which is higher than the charge starting voltage, is linear with respect to the applied voltage as shown in FIG. 7. This property is substantially immune to ambient conditions, that is, generally the same results are confirmed under high humidity and temperature conditions and under low-humidity and temperature conditions.

Namely, $Vc=Va-V_{TH}$

Va: DC voltage applied to the conductive roller 2;

Vc: potential of the surface of the OPC photosensitive drum;

$V_{TH}$: charge starting voltage.

The equation derives from Paschen's law.

Figure 8:
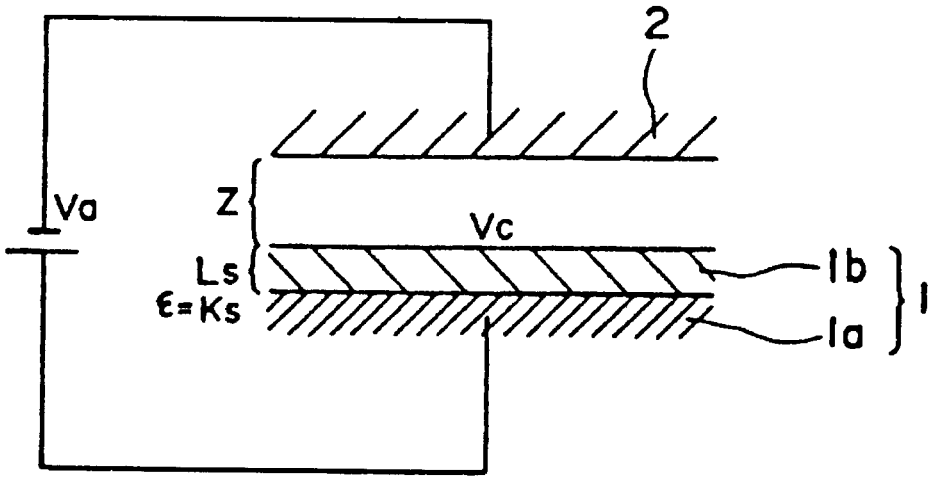
FIG. 8 shows a model of a gap between the photosensitive layer and the conductive roller.

FIG. 8 shows a model of microscopic clearance between the surface of the photosensitive drum and the conductive roller [2, the] 2. *The* voltage $V_g$ across the microscopic gap Z between the OPC photosensitive layer 1b and the conductive roller 2 is expressed by the following equation:

$$Vg=[(Va-Vc)Z]/(Ls/Ks+Z) \quad (1)$$

Va: applied voltage

Vc: surface potential of the photosensitive layer

Z: gap

Ls: thickness of the photosensitive layer

Ks: dielectric constant of the photosensitive layer

On the other hand, the air gap break-down voltage Vb can be expressed by a linear expression on the basis of Paschen's law where the gap Z is more than 8 microns, as [follows.] *follows:*

$$Vb=312+6.21Z \quad (2)$$

Figure 9:
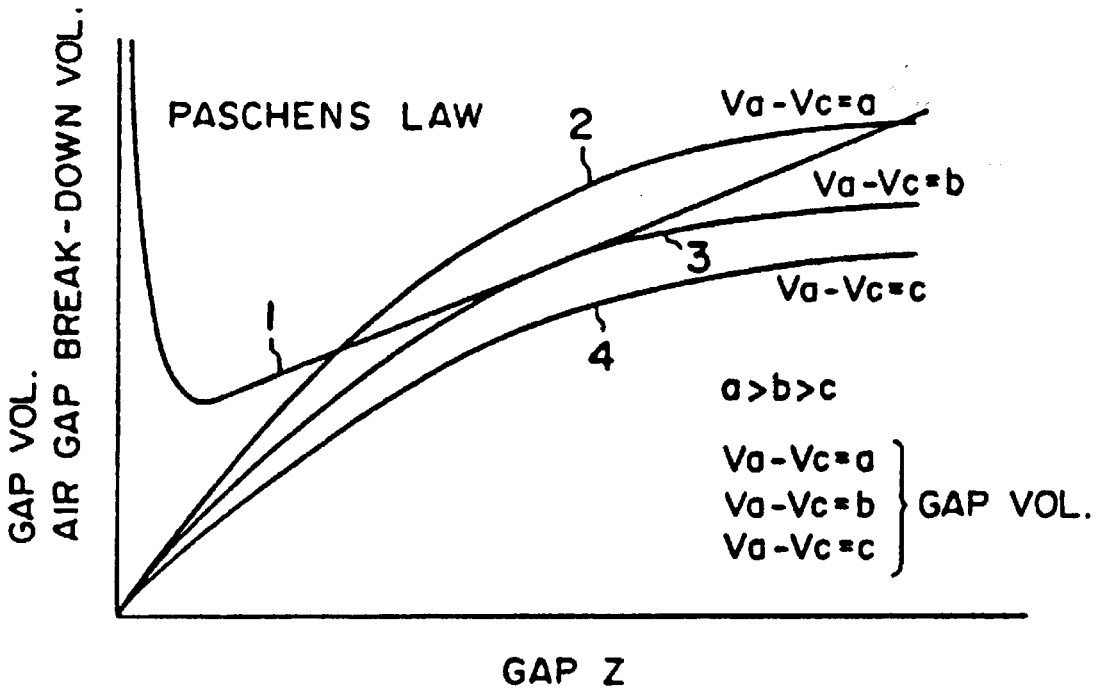
FIG. 9 is a graph showing a relationship between Paschen's curvature and the gap voltage.

(1) and (2) are plotted on a graph in FIG. 9 which shows the air gap break-down voltage or gap voltage as a function of the gap Z. In the graph, reference numeral 1 designates a Paschen curve which is convex-shaped-down, and reference numerals 2, 3, and 4 designate the gap voltages Vg curves which are convex-shaped-up with a parameter of Va–Vc.

The electric discharging action occurs when the curves 2, 3 or 4 cross the Paschen curve 1. At the point of the discharge start, a discriminant of a quadratic of Z given by Vg=Vb=0, that is, $$(Va-Vc-312-6.2\times Ls/Ks)^2=4\times 6.2\times 312\times Ls/Ks$$

That is, $$Vc = Va - (\sqrt{7737\ 6\times Ls/Ks} + 312 + 6.2\times Ls/Ks) \quad (3)$$

$$(Vc = Va - T_{TH})$$

When the dielectric constant 3 of the OPC photosensitive layer 1b and the thickness of 19 microns of the CTL layer are substituted into the right side of the equation (3), the following results:

$$Vc=Va-573$$

This is generally the same as the equation obtained from experiments.

Paschen's law relates to a discharge in the gap. Even when charging using the conductive roller 2, the production of a small amount of ozone is recognized at a position very close to the charging portion (1/100–1/1000 of the case of corona discharge), so that it is considered that the charging by the conductive roller involves a discharge phenomena in one way or another.

Figure 10:
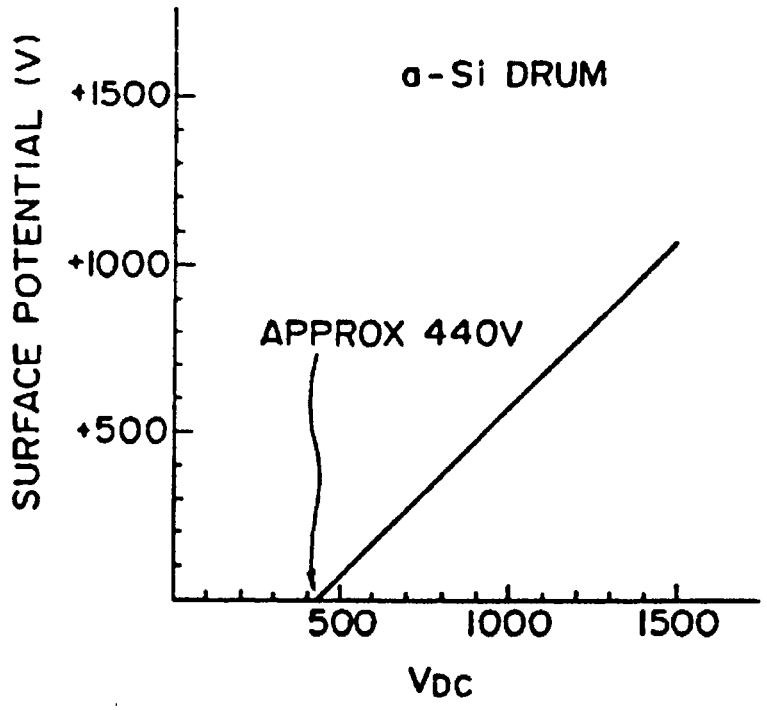

FIG. 10 is a graph showing the results of measurements of the DC voltage applied to the conductive roller 2 and the surface potential of the photosensitive drum 1 after being charged by the conductive roller 2, when the photosensitive layer [1] *1b* of the photosensitive drum 1 is replaced by an amorphous silicon photosensitive drum.

To minimize the influence of dark decay, the experiments were carried out without exposure to light prior to the charging step. The charging was started at $V_{TH}$ approximately =440 V, and with the higher voltage a linear relationship was confirmed similar to the OPC photosensitive drum case shown in FIG. 7.

When Ks=12 and Ls=20 microns of an amorphous silicon photosensitive drum are substituted for Ks and Ls of the equation (3), $V_{TH}$=432 V, which is substantially the same as results of experiments.

When a DC voltage is applied to a conductive roller 2, the surface of the photosensitive member is charged with the properties described above. When the electrostatic pattern resulted is developed by a known developing method, a spotty pattern results due to the spotty charging.

For the purpose of eliminating non-uniformness of the charging, the inventors applied a vibratory voltage provided by a DC voltage and an AC voltage superposed therewith to the conductive roller. As a result, it has been found that it is effective for the elimination of the non-uniformness to superpose on the DC voltage an AC voltage having a certain level of peak-to-peak voltage.

This will be explained in detail.

II. When a vibratory voltage is provided by the superposed DC and AC voltage to the conductive roller:

The OPC photosensitive drum and amorphous silicon photosensitive drum [or] *are* the same as the ones used in Part I.

A vibratory voltage ($V_{DC}$+$V_{AC}$) provided by superposing a DC voltage $V_{DC}$ and an AC voltage $V_{AC}$ having a peak-to-peak voltage Vp–p is applied to the conductive roller 2 to contact-charge the amorphous silicon photosensitive drum. The peak-to-peak voltage and the charged potential of the surface of the photosensitive drum are measured.

Figure 3:
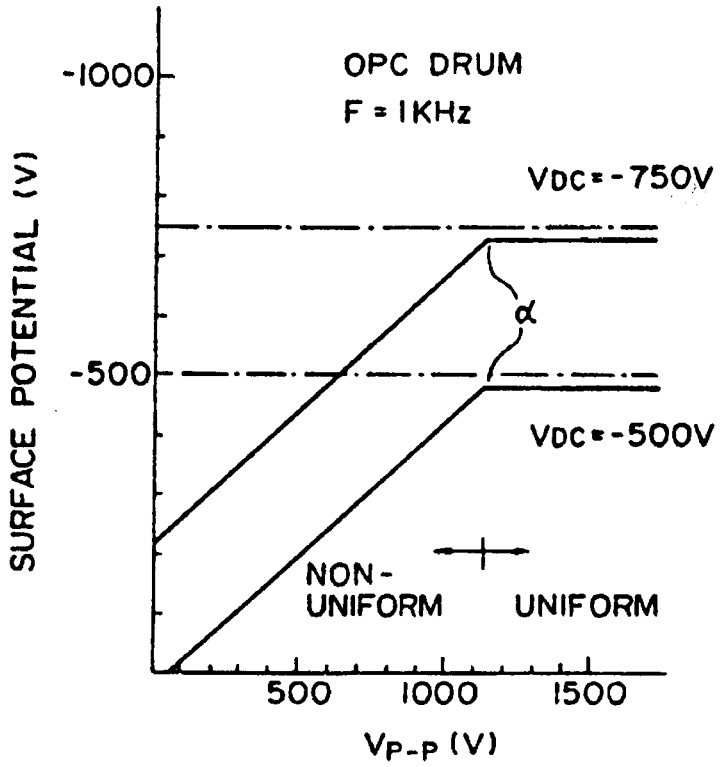
FIGS. 3 and 4 are graphs showing a relationship between an applied voltage Vp–pand the charge potential V of the photosensitive member, for an OPC (organic photoconductor) photosensitive drum and an amorphous silicon photosensitive drum.
Figure 4:
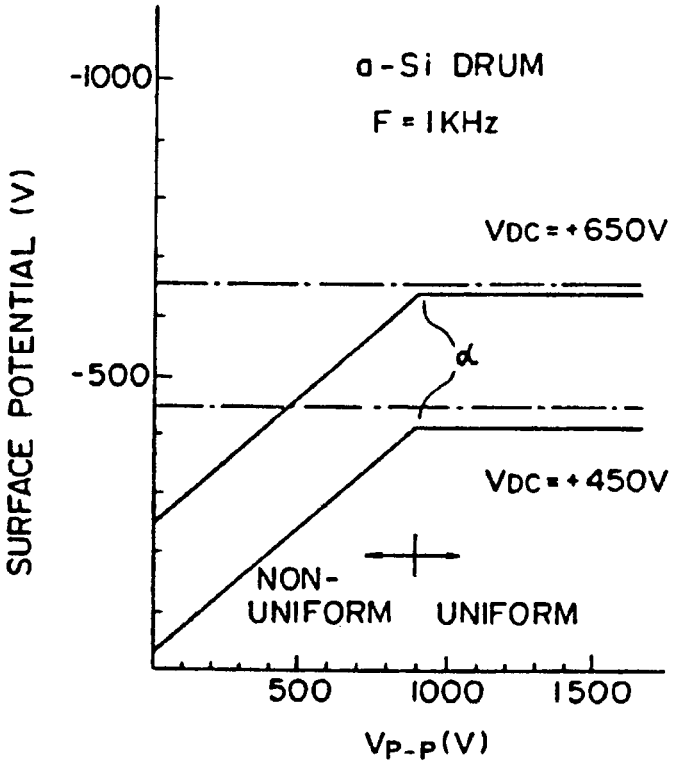

FIGS. 3 and 4 show the results.

In the area of small Vp–p, the potential increases substantially linearly proportionally with Vp–p. When it is beyond a certain level, the potential levels off substantially at the $V_{DC}$ level of the DC component of the applied voltage and becomes substantially constant irrespective of an increase of Vp–p.

The inflection point α with respect to Vp–p is approximately 1100 V as shown in FIG. 3 in the case of OPC photosensitive drum, and approximately 900 V in the case of the amorphous silicon drum as shown in FIG. 4. These values are approximately twice the charge starting voltage $V_{TH}$ when the DC voltage is applied (Part I).

Even if the frequency of the AC voltage and the voltage level $V_{DC}$ of the DC component of the applied voltage are changed, the position of the inflection point α with respect to Vp-p is constant, although the level-off point of the charged potential changes with the variation of $V_{DC}$. Also, the inflection point is not dependent on the relative speed between the conductive roller 2 and the photosensitive member 1, including for example stopping, forward rotation and backward rotation.

The surface of the photosensitive drum *is* charged by the conductive roller supplied by the superposed DC component.

If the level of Vp–p is small, that is, when there is a linear relationship between Vp-p/2 and the charged potential, i.e. inclination is 1, a spotty charging results like when a DC voltage alone is applied to the conductive roller 2. However, if a peak-to-peak voltage higher than the inflection point α is applied, the charged potential level is constant, and the resultant developed image is uniform, that is, the charging is [uniformn] *uniform*.

That is, in order to obtain uniform charging, it is necessary to apply between the photosensitive member and the conductive roller a vibratory voltage having a peak-to-peak voltage, which is not less than the absolute value of the charge starting voltage $V_{TH}$. The DC voltage *is* determined on the basis of the various properties or the like of the photosensitive member which is a member to be charged. The surface potential of the photosensitive member provided is dependent on the DC component of the voltage applied.

The relationship among the uniformness of the charging, the peak-to-peak voltage Vp–p of the vibratory voltage and the charge starting voltage $V_{TH}$, more particularly, the uniform charging is provided when Vp-p>2 $V_{TH}$ is exemplarily confirmed. This is theoretically supported as follows.

With respect to the relationship between the charged potential and the Vp–p change, the inflection point α is considered to be a starting point where the electric charge starts to transfer back from the photosensitive member to the conductive roller under the vibratory field between the photosensitive member and the conductive roller, provided by the vibratory voltage application.

Figure 5:
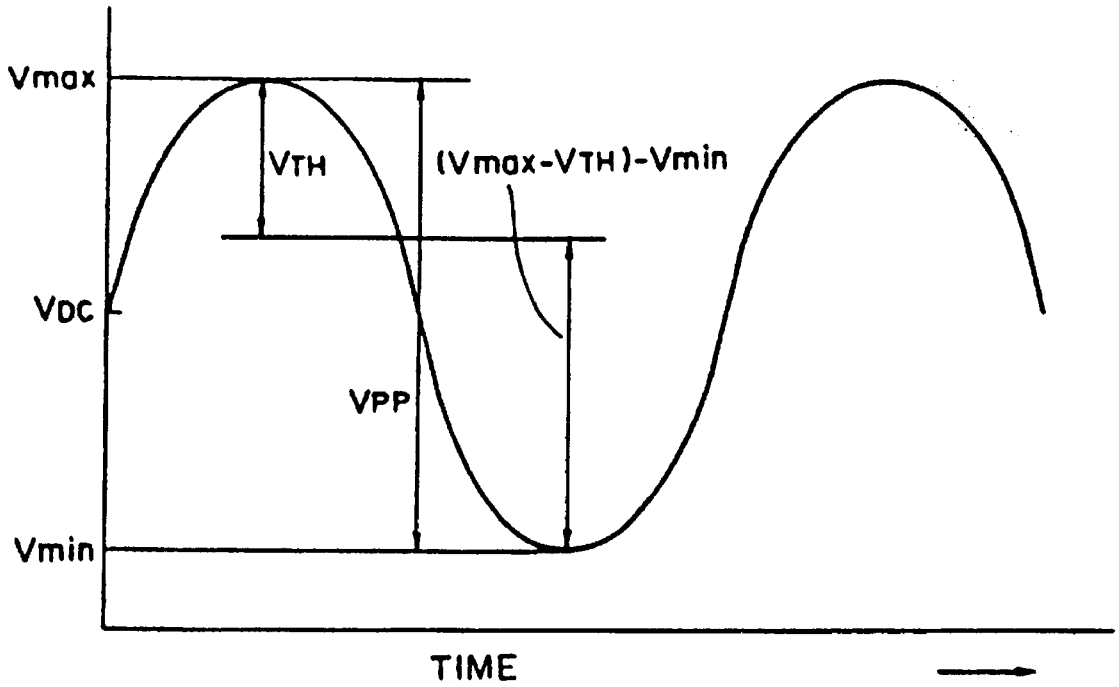
FIG. 5 is an example of a voltage applied to the conductive roller.

FIG. 5 shows a waveform of the applied voltage to the conductive roller. For the sake of simplicity, it is assumed that the vibratory voltage waveform is such that a DC component $V_{DC}$ and an AC component Vp–p of a sine wave, the Vmax and Vmin of the vibratory voltage are expressed as follows:

$$V_{max}=V_{DC}+V_{p-p}/2$$

$$V_{min}=V_{DC}+V_{p-p}/2$$

When the voltage of Vmax is applied, the photosensitive member, by the equation Vc=Va–$V_{TH}$, is charged to the following surface potential:

$$[V=V_{DC}+V_{p-p}/2]\ V=V_{DC}+V_{p-p/2-VTH}.$$

In the process of the applied voltage to the conductive roller relative to the surface potential approaching the minimum Vmin, when the potential difference goes beyond the charge starting voltage $V_{TH}$, the excessive charge on the photosensitive member is transferred back to the conductive roller.

The fact that the transfer and the back transfer of the charge between the conductive roller and the photosensitive roller are carried out under the existence of the threshold $V_{TH}$, means that the transfer of the charge therebetween is determined on the basis of the gap voltage, and therefore, the charge transfer is directionally equivalent.

For this reason, for the back transfer to occur, the following must be satisfied:

$$[(V_{DC}+V_{p-p}/2-V_{TH})-(V_{DC}-V_{p-p}/2)\geqq V_{TH}]\ (V_{DC}+V_{p-p}/2-V_{TH})-(V_{DC}-V_{p-p}/2)\geqq V_{TH}$$

$$(V_{DC}+Vp\text{-}p/2-V_{TH}-(V_{DC}-Vp\text{-}p/2\geqq V_{TH}$$

That is, $$Vp\text{–}p\geqq 2V_{TH}$$

This agrees with the above described experimental equation.

In other words, even if an excessive charge is deposited locally on the photosensitive member to provide a high potential, the back transition of the charge makes the potential uniform.

By the formation of the vibratory electric field by the vibratory voltage between the conductive roller and the photosensitive member, the charge transfers and transfers back therebetween, wherein the charge transfer is dependent on the threshold $V_{TH}$. It is assumed that the charge movement occurs when a potential difference, not less than the threshold $V_{TH}$ in a certain determined distance, in the area where the conductive roller and the photosensitive drum are close to each other, the charge potential of the photosensitive drum vibrates in the manner shown in FIG. 6 by a broken line, which is similar to a pulse wave. As seen in the Figure, the amplitude is $Vp-p/2-T_{TH}$.

Figure 6:
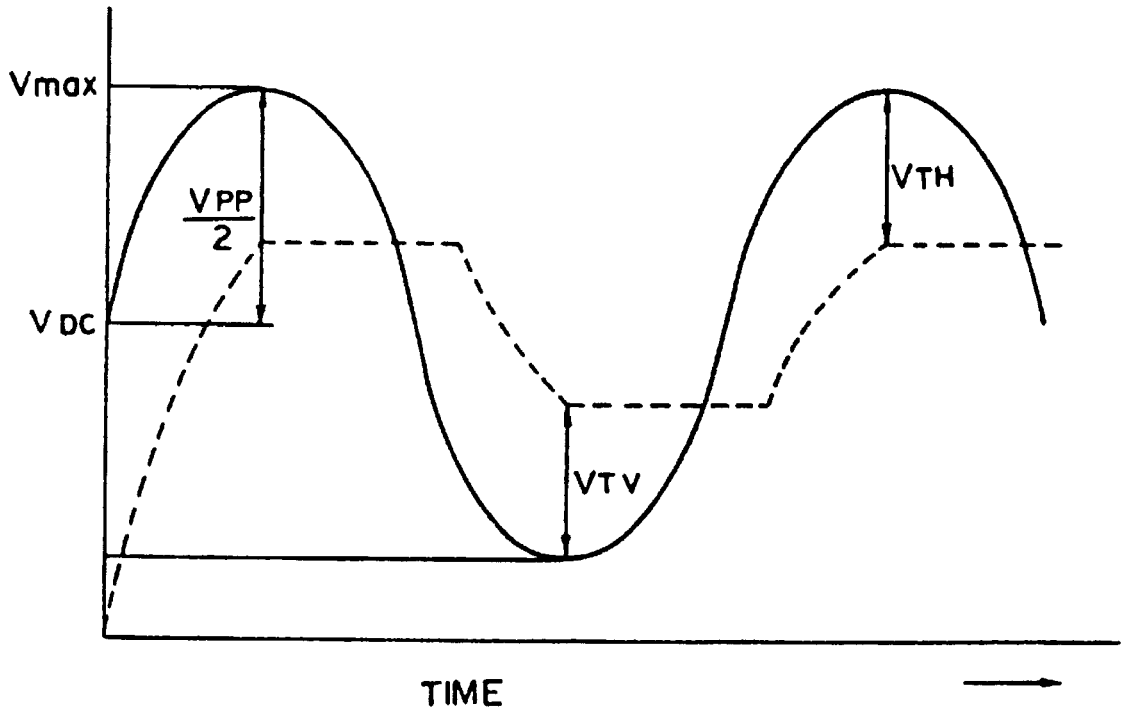
FIG. 6 is a graph illustrating the vibration of the charge potential of the drum in the region where the conductive roller and the photosensitive drum are close.

In FIG. 6, during the process of the conductive roller potential approaching Vmax, the surface potential of the photosensitive drum increases by the charge transfer from the conductive roller to the photosensitive drum such that the potential difference becomes $V_{TH}$. On the contrary, in the process of the potential of the conductive roller decreasing from Vmax to Vmin, the charge transfer does not occur until the potential difference between the conductive roller and the charged potential of the photosensitive drum becomes the [thresehold] *threshold* $V_{TH}$. Therefore, the charged surface potential gained thereby when the voltage Vmax is applied to the conductive roller is maintained, and thereafter, when the potential difference goes beyond $V_{TH}$, and at this time, the transfer (back transfer) of the charge occurs from the photosensitive drum to the conductive roller so that the potential difference becomes $V_{TH}$. Therefore, the charged potential of the photosensitive drum decreases until the voltage Vmin is applied to the conductive roller. By the repetition of these processes, the potential of the charged photosensitive drum vibrates with the center of $V_{DC}$ in the pulse-like waveform, as shown in FIG. 6 by broken lines.

On the other hand, with respect to the voltage $V_{TH}$, *it* is a potential difference in the smallest distance that produces the charge transfer because of its definition. Therefore, it is dependent on the distance, more particularly, the threshold voltage $V_{TH}$ required for transferring the charge which must be large if the gap between the conductive roller and the photosensitive drum is large. The position of the Paschen curve shown in FIG. 9 exhibits an increase of the air gap break-down voltage in accordance with an increase of the distance.

When the structure is such that the distance between the conductive roller 2 and the photosensitive drum 1 gradually increases toward the downstream from the contact point with respect to movement of the periphery of the photosensitive drum 1, the potential of the charged photosensitive drum vibrating in the pulse waveform having an amplitude of $Vp-p/2-V_{TH}$ as shown in FIG. 6 vibrates with smaller amplitude approaching zero with the increase of the threshold voltage $V_{TH}$. In the area where the charge does not transfer or transfer back where the distance is sufficiently large, the surface potential of the photosensitive member is not dependent on the peak-to-peak voltage Vp–p of the vibratory voltage applied to the conductive roller, but is stabilized at the level of $V_{DC}$.

Figure 11A:
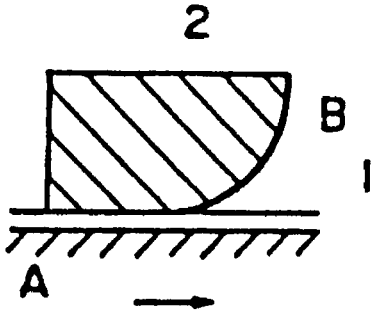
FIGS. 11A and 11B are sectional views of another example of the contact member.
Figure 11B:
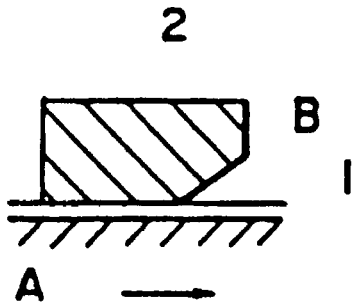

From this standpoint, in order to stabilize the potential of the charged member, the shape of the contact member to be contacted to the member to be charged is not [innevitably] *inevitably* limited to a roller shape. Instead, as shown in FIGS. 11A and B, for example, the shape may be such that the contact member includes a portion A contacted to the member to be charged, and a portion B, continuous from the portion A, to provide an increasing distance from the member 1 to be charged toward the downstream of the member to be charged with respect to its movement. FIGS. 11A and B show it as a pad contacted to the member to be charged 1.

As described hereinbefore, between the photosensitive drum as the member to be charged and the conductive roller as a contacting member, it is considered that the charge transfers and transfers back, so that a desired voltage can be provided after charging with high precision independently of the potential of the member to be charged prior to the charging operation.

The charging device according to the present invention involves the effects similar to that of a grid used with conventional corona dischargers, and therefore, a stabilized charging process is enabled without the phenomena of varied image provided by varied electrostatic latent image in electrophotography.

Figure 12:
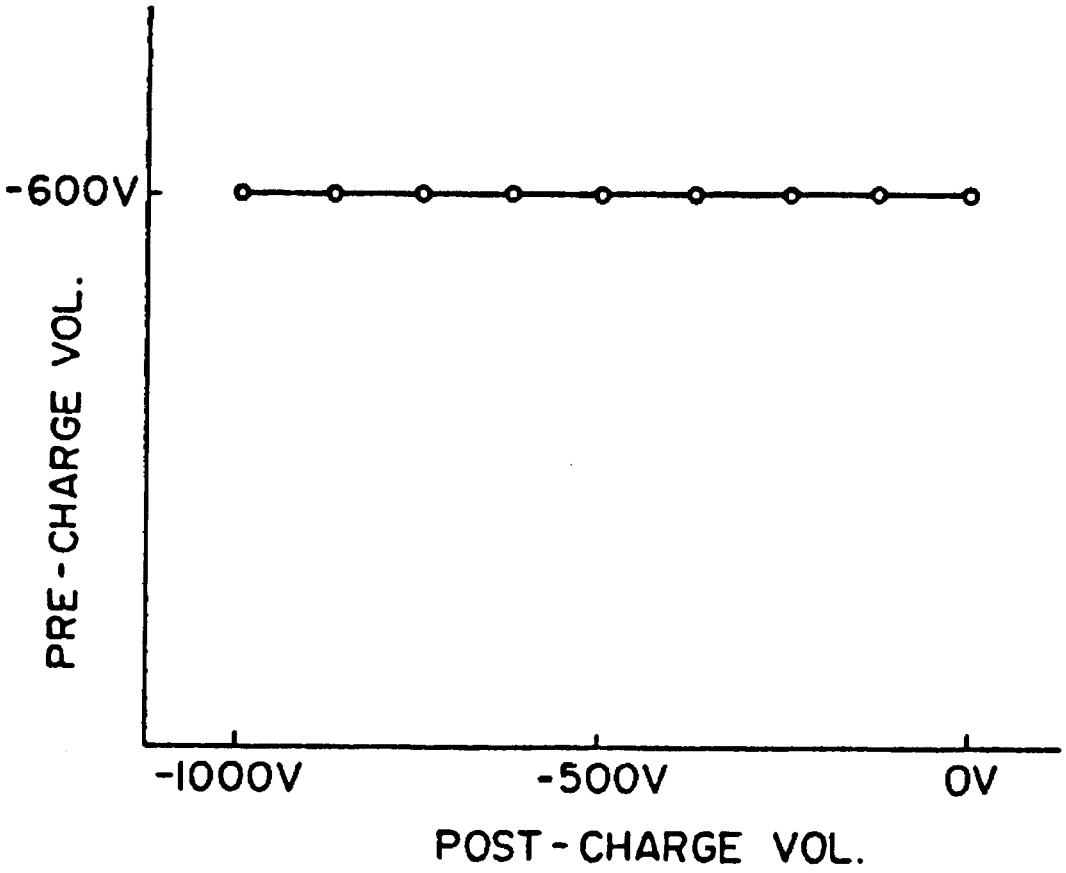
FIG. 12 is a graph showing the relationship between the potentials of the photosensitive drum before and after charging.

FIG. 12 shows the results when a vibratory voltage of $V_{DC}$=−630 V and frequency of F=1000 Hz is applied to the conductive roller, and the photosensitive drum is of OPC (negative property).

In the foregoing embodiment, the waveform of the vibratory voltage is a sine wave as shown in FIG. 5, but this is not limiting, and as an alternative a rectangular wave or pulse wave may be used for the vibratory voltage.

Next, [the] an example will be explained wherein the charging device according to the present invention is incorporated into an image forming apparatus.

Figure 13:
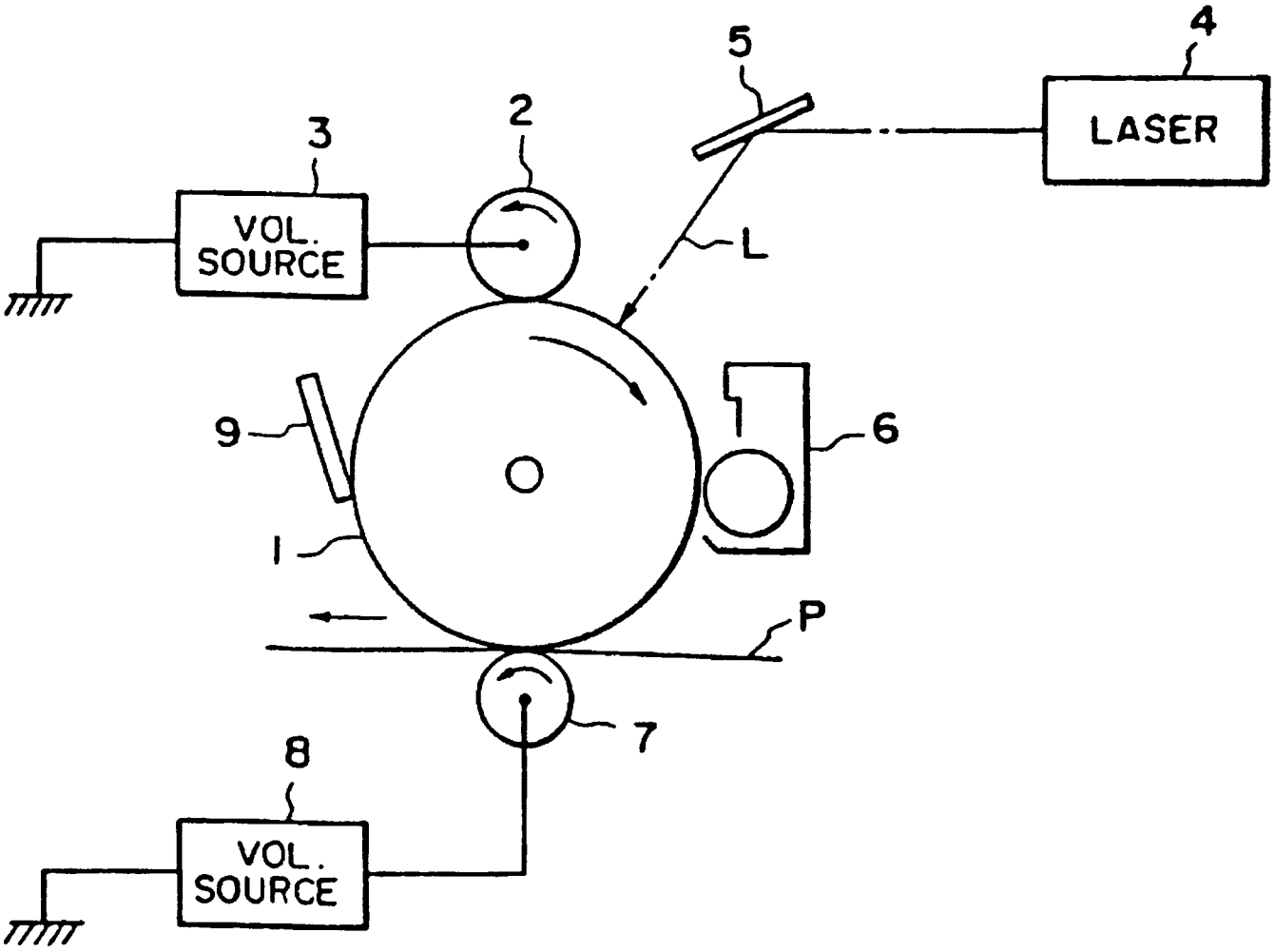
FIG. 13 shows an example of the charging device according to the present invention when used with an electrophotographic apparatus.

Referring to FIG. 13, the charging device according to the present invention is used in an electrophotographic apparatus which is, in this example, a laser beam printer.

The photosensitive drum 1 is uniformly charged to a predetermined potential by a conductive roller 2, and thereafter, is scanningly exposed to a laser beam L through a mirror 5, the laser beam L being modulated in accordance with image information from a known laser scanner unit 4. By this exposure, an electrostatic latent image is formed on the photosensitive drum 1 in accordance with the image information. Then, the electrostatic latent image is visualized by the developing device 6.

The visualized image formed on the photosensitive drum 1 is transferred onto a sheet P by a transfer roller 7 at a transfer station, the sheet P having been transferred by an unshown conveying means. In this embodiment, the transfer roller 7 is supplied with a DC voltage having a polarity opposite to that of the visualized image from the power source 8.

The sheet P on which the visualized image is transferred from the transfer roller 7 is conveyed to an image fixing means not shown, where the visualized image is fixed on the sheet P.

On the other hand, the developer remaining on the photosensitive drum 1 after the image transfer is removed by a cleaner 9, so that the surface of the photosensitive drum 1 is cleaned, and the photosensitive drum is prepare for the next image forming operation.

In such an image forming apparatus, the charging device according to the present invention can be employed forming a good image without non-uniform charging. This is due to the above-described vibratory voltage being applied to the conductive roller 2 from the power source 3.

In this embodiment, the description has been made with the primary charging means for charging the photosensitive drum. However, the present invention is applicable to an image transfer charging means.

In this embodiment, the scanning exposure means *is* of a laser beam type, but this is not limiting, and the present invention is applicable to an electrophotographic apparatus having a conventional analog type exposure optical system.

As described in foregoing, according to the present invention, a vibratory voltage having a peak-to-peak voltage, which is not less than twice the absolute value of the charge starting voltage to a member to be charged, is applied between the member to be charged and a contacting member contacted thereto. This forms a vibratory electric field therebetween to charge the member to be charged, whereby no spotty charging occurs on the member to be charged, so that it can be uniformly charged to a predetermined always stable potential. According to the charging device of the present invention, a low voltage is [usable] *used* for charging a member as compared with the corona discharging device.

While the invention has been described with reference to the structures disclosed herein, it is not confined to the details set forth and this application is intended to cover such modifications or changes as may come within the purposes of the improvements or the scope of the following claims.

What is claimed is:

1. A charging device for charging a movable member to be charged, comprising:

a contacting member adapted to [contacting] *contact* the member to be charged; and

[means for forming a vibratory electric field between the member to be charged and the contacting member, the vibratory electric field forming means applying between the members a vibratory voltage having a peak-to-peak value not less than twice an absolute value of a charge starting voltage to the member to be charged] *a voltage applying means for applying, between said member to be charged and said contacting member, a vibratory voltage to form a vibratory electric field between said member to be charged and said contacting member, said vibratory voltage having a peak-to-peak voltage which is not less than twice an absolute value of a charge starting voltage of the member to be charged.*

2. A charging device according to claim 1, wherein said contacting member has a portion [which is increasingly away from] *continuous with a contact portion of said contacting member, to provide an increasing distance between said contacting member and* the member to be charged [toward] *in a downstream* direction from [a] *said* contact portion [therebetween] with respect to movement of the member to be charged.

3. A charging device according to claim 2, wherein said contacting member is a rotational member.

4. A charging device according to claim 3, wherein said contacting member is a conductive roller.

5. A charging device according to claim 1 or 2, wherein said [vibratory electric field is provided by a vibratory voltage provided by superposing a DC voltage and an AC voltage] *vibration voltage is an AC voltage biased with a DC voltage.*

6. A charging device according to claim 5, wherein said charge starting voltage is a *DC* voltage when [a] charging starts with the DC voltage alone [is] *being* applied between the contacting member and the member to be charged.

7. A charging device according to claim 1, wherein said member to be charged is a photosensitive member.

8. A charging device according to claim 1, wherein the vibratory voltage has a sine curve wave form.

9. A charging device according to claim 1, wherein said contacting member is coated with a material having a resistivity in the range of $10^2$ to $10^{10}$ ohm-cm.

10. A charging device according to claim 1, wherein the potential of the member to be charged after being charged by said contacting member is uniform irrespective of its potential before charging.

11. A charging device according to claim 3, wherein said contacting member is a rotational member which rotates to follow the movement of the member to be charged.

12. A charging device according to claim 4, wherein the contacting member comprises a conductive roller having a core member, a layer covering said core member, and a surface layer formed thereon.

13. A charging device according to claim 7, wherein the member to be charged is composed of an organic photoconductive material.

*14. A method for electrically charging a member to be charged by a charging member contactable to the member to be charged, comprising the steps of:*

*disposing the charging member so that a portion of the charging member is separated from the member to be charged by an increasing distance; and*

*applying between the charging member and the member to be charged a vibratory oscillating voltage having a peak-to-peak voltage which is not less than twice an absolute value of a charge starting voltage of the member to be charged, so that a vibratory electric field is formed between a surface of the member to be charged and the portion of the charging member.*

*15. A method according to claim 14, wherein the vibratory voltage applied between the charging member and the member to be charged is in the form of a DC-biased AC voltage.*

*16. A method according to claim 14, wherein the charging member is in the form of a roller.*

*17. A method according to claim 14, wherein the charging member is in the form of a pad.*

*18. A method according to claim 14, wherein said charge starting voltage is a DC voltage at which charging starts when a DC voltage alone is applied between the charging member and the member to be charged.*

*19. A method according to claim 14, wherein the potential of the member to be charged after being charged by said charging member is uniform irrespective of its potential before charging.*

*20. An image forming apparatus, comprising:*

*an image bearing member;*

*a charging member, contactable to said image bearing member, for electrically charging said image bearing member; and*

*voltage applying means for applying, between the charging member and said image bearing member, a vibratory oscillating voltage to form a vibratory electric field between said image bearing member and said charging member, said vibratory oscillating voltage having a peak-to-peak voltage which is not less than twice an absolute value of a charge starting voltage of said image bearing member to be charged.*

*21. An apparatus according to claim 20, wherein said charge starting voltage is a DC voltage when charging starts with the DC voltage alone being applied between the charging member and the image bearing member.*

*22. An apparatus according to claim 21, wherein the charging member has a portion continuous with a contact portion of the charging member, to provide an increasing distance between the charging member and said image bearing member in a downstream direction from said contact portion with respect to a movement direction of said image bearing member.*

* * * * *

UNITED STATES PATENT AND TRADEMARK OFFICE

CERTIFICATE OF CORRECTION

PATENT NO. : Re. 35,581

DATED : August 12, 1997

INVENTOR(S) : SHUNJI NAKAMURA, ET AL.

It is certified that error appears in the above-identified patent and that said Letters Patent is hereby corrected as shown below:

ON THE COVER PAGE:

Under item [56], "U.S. PATENT DOCUMENTS":

"Uehida et al." should read --Uchida et al.--.

COLUMN 2:

Line 51, "Vp-pand" should read --Vp-p and--.

COLUMN 6:

Line 35, "$V_{max}=V_{DC}+V_{p-p}/2$" should read --$V_{max}=V_{DC}+V_{p-p}/2$--;

Line 37, "$V_{min}=V_{DC}+V_{p-p}/2$" should read --$V_{min}=V_{DC}-V_{p-p}/2$--;

Line 43, "$V=V_{DC}+V_{p-p/2-VTH}$" should read --$V=V_{DC}+V_{p-p}/2-V_{TH}$--;

and

Line 63, "$(V_{DC}+Vp-p/2-V_{TH}-(V_{DC}-Vp-p/2\geq V_{TH}$" should be deleted.

UNITED STATES PATENT AND TRADEMARK OFFICE

CERTIFICATE OF CORRECTION

PATENT NO. : Re. 35,581 Page 2 of 2

DATED : August 12, 1997

INVENTOR(S) : SHUNJI NAKAMURA, ET AL.

It is certified that error appears in the above-identified patent and that said Letters Patent is hereby corrected as shown below:

COLUMN 8:

Line 57, "prepare" should read --prepared--.

Signed and Sealed this

Fourteenth Day of April, 1998

Bruce Lehman

*Attest:*

BRUCE LEHMAN

*Attesting Officer*

*Commissioner of Patents and Trademarks*